March 18, 1947.  N. JENSEN  2,417,553
HAND TRUCK
Filed July 30, 1945
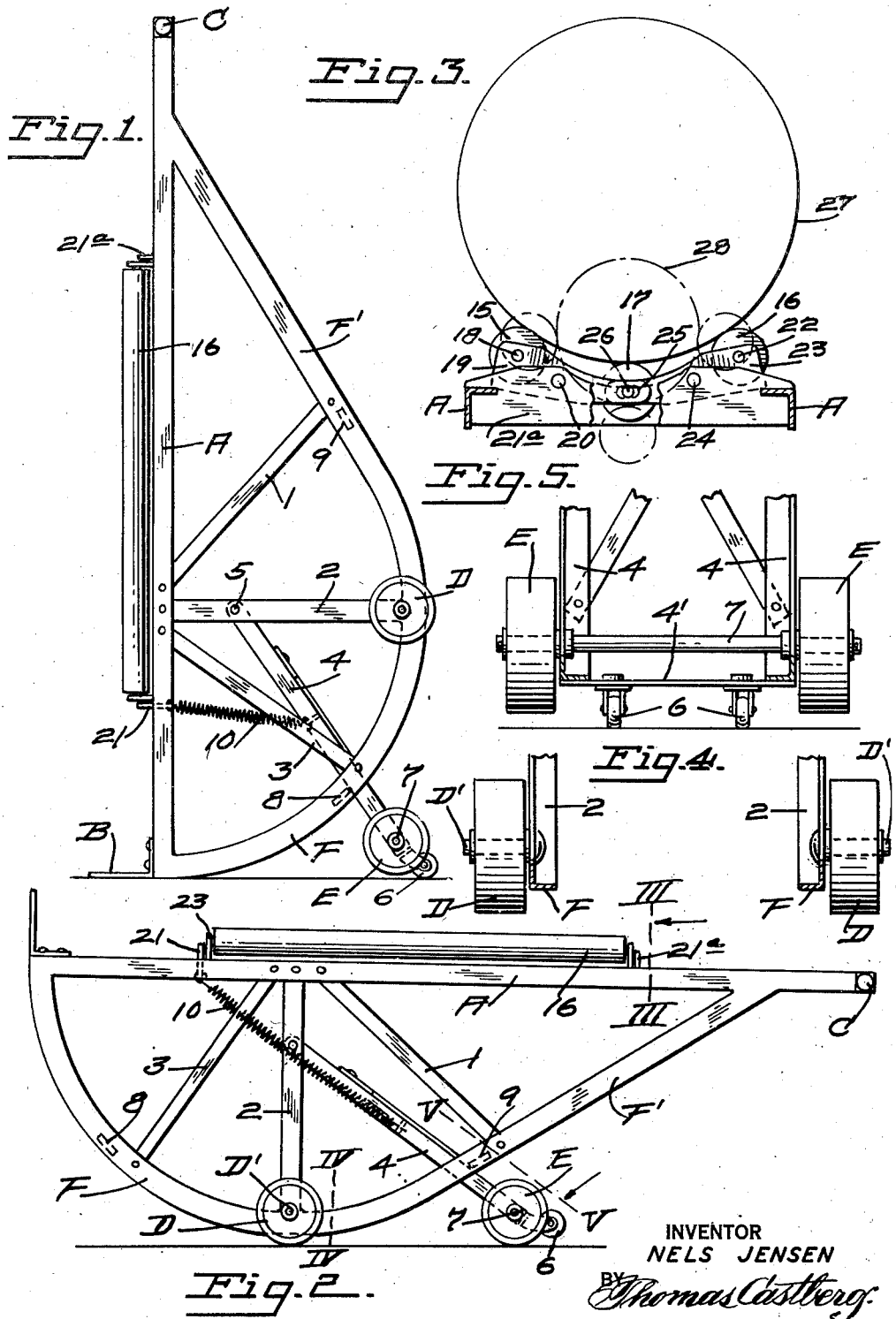
INVENTOR
NELS JENSEN
BY Thomas Castberg
ATTORNEY Patented Mar. 18, 1947

2,417,553

UNITED STATES PATENT OFFICE 2,417,553

HAND TRUCK

Nels Jensen, Grass Valley, Calif.

Application July 30, 1945, Serial No. 607,827

4 Claims. (Cl. 280—49)

This invention relates to hand trucks of a type especially designed to move rolls of linoleum or the like from place to place and to support a roll of linoleum in a horizontal position where it may be readily unrolled for the purpose of display or for any other purpose.

The object of the present invention is generally to improve and simplify the construction and operation of trucks of the character described; to provide a truck which assumes a vertical position and functions as a two-wheel truck when picking up a roll of linoleum, and which when swung to a horizontal position becomes a four-wheel truck that can readily be pushed or pulled about with the roll of linoleum in a horizontal position; to provide means whereby the weight of the truck and the linoleum roll supported thereby may be quickly and readily shifted from a vertical to a horizontal position or vice-versa with comparatively little effort on the part of the operator; and further, to provide means whereby the roll of linoleum when in horizontal position may be readily rotated about its axis to unroll the linoleum for display or any other purpose.

The hand truck is shown by way of illustration in the accompanying drawings in which:

Fig. 1 is a side elevation of the hand truck showing it in vertical position;

Fig. 2 is a similar view showing the hand truck when assuming horizontal position;

Fig. 3 is a cross section taken on line III—III of Fig. 2;

Fig. 4 is a cross section taken on line IV—IV of Fig. 2; and

Fig. 5 is a cross section taken on line V—V of Fig. 2.

Referring to the drawings in detail, and particularly Figs. 1, 2 and 3, A indicates in general the main frame of the truck. This frame consists of a pair of spaced apart longitudinally extending angle bars as clearly shown in Fig. 3 which are connected at intervals by cross bars 21. Suitably secured to the forward ends of the bars A is a shovel plate B, and suitably secured to the opposite ends of the angle bars is a handle C. Extending downwardly from each bar A or disposed at each side of the frame are bars such as indicated at 1 and 2 and 3, and secured to said bars is a pair of quadrant-shaped rocker members F. That is, the rocker members extend from the shovel plate B to a pair of wheels indicated at D. From there they extend to a point adjacent the handle C and as such merely function as braces as indicated at F'. The wheels D rotate about journal pins D' secured to the lower ends of the braces 2—2 and serve the function of supporting wheels as will hereinafter be described.

A pair of arms 4—4 is pivoted to the respective braces 2—2 as indicated at 5. Their opposite ends are connected by a cross bar 4' and this bar supports a pair of swivel casters 6. A shaft 7 also extends crosswise of the arms 4—4, and journaled on the outer ends of said shaft is a pair of supporting wheels generally indicated at E. The arms 4 together with the wheels E and the casters 6 are free to swing about the pivot 5, but the swinging movement is limited by stop members or cross bars 8 and 9 secured between the quadrants F and the braces F' respectively. A spring 10 is connected at one end to one of the cross braces 21 on the main frame and at the opposite end to the arms 4. This spring exerts a constant pull on the arms 4 and tends to pull the arms forwardly into engagement with the stop 8 as shown in Fig. 1.

Two of the cross braces indicated at 21 and 21a are shaped as shown in Fig. 3. On each of these braces are mounted pins 20 and 24 and these function as pivots for a pair of arms 19 and 23. The inner ends of these arms are longitudinally slotted as shown at 25 and these slots function as an automatically adjustable bearing or support for a shaft 26 upon which is secured a roller 17. The outer ends of the arms function as journals and supports for shafts 18 and 22, and these shafts carry rollers 15, 16 respectively. The rollers 15, 16 and 17 are parallel to each other and extend lengthwise of the main frame as shown in Fig. 2 and form a bed or support for a roll of linoleum or the like indicated at 27.

In actual practice it is well known that rolls of linoleum are stacked on their ends in a vertical position whether it be in a warehouse or a store, and it is furthermore known that these rolls are very heavy and awkward to handle. The hand truck forming the subject matter of this application is especially designed for the handling of rolls of this character. For instance in the store handling linoleum it is often necessary for the salesman or a helper to bring out a number of rolls of linoleum from the storeroom to the display room in order that they may be shown or displayed to a prospective customer. In this instance if a roll is to be displayed, the truck is rolled into the storeroom and swung from the horizontal position shown in Fig. 2 to the vertical position shown in Fig. 1. In doing so the spring 10 exerts a pull on the arms 4 and wheels E, and the casters 6 are accordingly swung forward to assume the position shown in Fig. 1.

The roll of linoleum is tilted and the shovel plate B is pushed in under the end of the roll and it is then tilted back against the truck or the rollers 15, 16 and 17. The operator then pulls on the handle C and the load is immediately transferred from the shovel plate to the rockers or quadrants F, thus relieving the operator of substantially all of the load until horizontal position is reached. During this movement, the arms 4 and wheels E swing rearwardly and finally assume the position shown in Fig. 2. Thus, while the truck assumes a vertical position, it functions as an ordinary two-wheel hand truck, but when it is swung to a horizontal position, the load is transferred to the four wheels D and E and it functions as a four-wheel truck. The roll of linoleum is now in a horizontal position and as it rests on the rollers 15, 16 and 17, it may be readily unrolled for display or otherwise, and just as readily re-rolled.

When the truck assumes vertical position as shown in Fig. 1, it will be noted that the wheels E are off the floor and that the arms are supported by the caster 6. This is important as swivel casters are employed and permit the truck to be readily maneuvered while in a vertical position. When the truck assumes the position shown in Fig. 2, the casters are off the floor and hence the full load of the truck itself and the linoleum load carried thereby is supported by the wheels D and E.

In view of the fact that the rolls 15 and 16 and 17 which support the linoleum roll are mounted in the arms 19 and 23 which are pivoted as indicated at 20 and 24, it is obvious that linoleum rolls of different size can be supported thereby as the rollers are self-adjusting, and it will further be noted that if a roll of linoleum is being unrolled and, for instance, gradually decreases in diameter from the size shown at 27 to that shown at 28, the rollers 15 and 16 will gradually swing inwardly while the roller 17 will move downwardly. Hence, the roll of linoleum is roller-supported under all conditions.

While the truck has been described as especially designed for the handling of linoleum rolls, it is obvious that it may be used for rollers of sheet material of any character, and that while other features of the invention have been more or less specifically described and illustrated, it should be understood that changes may be resorted to within the scope of the appended claims and that the materials and finish of the several parts employed may be such as the experience or judgment of the manufacturer may dictate or varying conditions or uses may demand.

I claim:

1. A truck for handling and displaying rolls of linoleum or the like comprising an elongated frame, a shovel plate secured at one end thereof to receive and support a linoleum roll in vertical position, a handle at the opposite end of the frame, a plurality of laterally spaced rollers journaled on the frame intermediate the shovel plate and the handle and extending longitudinally of the frame, said rollers supporting the linoleum roll in a horizontal position and permitting unrolling of the linoleum roll, a pair of laterally spaced wheels forming a support for the forward end of the frame, an arm pivoted at one end to the frame, a pair of laterally spaced wheels journaled at the opposite end of the arm, a spring connected with the arm and normally maintaining the arm and the wheels carried thereby in engagement with a stop member positioned forward of the first-named wheels when the truck assumes a vertical position, said arm and the wheels carried thereby swinging rearwardly when the frame is swung from a vertical to a horizontal position and engaging a stop on the frame at a point rearwardly of the first-named wheels whereby a four-wheel support is formed for the truck and the linoleum roll supported thereby.

2. A truck for handling and displaying rolls of linoleum or the like comprising an elongated frame, a shovel plate secured at one end thereof to receive and support a linoleum roll in vertical position, a handle at the opposite end of the frame, a plurality of laterally spaced rollers journaled on the frame intermediate the shovel plate and the handle and extending longitudinally of the frame, said rollers supporting the linoleum roll in a horizontal position and permitting unrolling of the linoleum roll, a pair of laterally spaced wheels forming a support for the forward end of the frame, an arm pivoted at one end to the frame, a pair of laterally spaced wheels journaled at the opposite end of the arm, a spring connected with the arm and normally maintaining the arm and the wheels carried thereby in engagement with a stop member positioned forward of the first-named wheels when the truck assumes a vertical position, said arm and the wheels carried thereby swinging rearwardly when the frame is swung from a vertical to a horizontal position and engaging a stop on the frame at a point rearwardly of the first-named wheels whereby a four-wheel support is formed for the truck and the linoleum roll supported thereby, and a pair of rocker-like members secured to the frame and extending from the shovel plate to the first-named wheels to support the weight of the truck and the linoleum roll carried thereby when swinging from a vertical to a horizontal position.

3. A truck for handling and displaying rolls of linoleum or the like comprising an elongated frame, a shovel plate secured at one end thereof to receive and support a linoleum roll in vertical position, a handle at the opposite end of the frame, a plurality of laterally spaced rollers journaled on the frame intermediate the shovel plate and the handle and extending longitudinally of the frame, said rollers supporting the linoleum roll in a horizontal position and permitting unrolling of the linoleum roll, a pair of laterally spaced wheels forming a support for the forward end of the frame, an arm pivoted at one end to the frame, a pair of laterally spaced wheels journaled at the opposite end of the arm, a spring connected with the arm and normally maintaining the arm and the wheels carried thereby in engagement with a stop member positioned forward of the first-named wheels when the truck assumes a vertical position, said arm and the wheels carried thereby swinging rearwardly when the frame is swung from a vertical to a horizontal position and engaging a stop on the frame at a point rearwardly of the first-named wheels whereby a four-wheel support is formed for the truck and the linoleum roll supported thereby, and a swiveled caster wheel secured to the lower end of the arm and maintaining the pair of wheels carried by the arm in a raised inoperative position when the truck assumes a vertical position.

4. A truck for handling and displaying rolls of linoleum or the like comprising an elongated frame, a shovel plate secured at one end thereof to receive and support a linoleum roll in vertical position, a handle at the opposite end of the frame, a plurality of laterally spaced rollers journaled on the frame intermediate the shovel plate and the handle and extending longitudinally of the frame, said rollers supporting the linoleum roll in a horizontal position and permitting unrolling of the linoleum roll, a pair of laterally spaced wheels forming a support for the forward end of the frame, an arm pivoted at one end to the frame, a pair of laterally spaced wheels journaled at the opposite end of the arm, a spring connected with the arm and normally maintaining the arm and the wheels carried thereby in engagement with a stop member positioned forward of the first-named wheels when the truck assumes a vertical position, said arm and the wheels carried thereby swinging rearwardly when the frame is swung from a vertical to a horizontal position and engaging a stop on the frame at a point rearwardly of the first-named wheels whereby a four-wheel support is formed for the truck and the linoleum roll supported thereby, and a pair of rocker-like members secured to the frame and extending from the shovel plate to the first named wheels to support the weight of the frame and the linoleum roll carried thereby when swinging from a vertical to a horizontal position or vice versa.

NELS JENSEN.

REFERENCES CITED

The following references are of record in the file of this patent:

UNITED STATES PATENTS

| Number | Name | Date |
|---|---|---|
| 1,866,887 | Gleason et al. | July 12, 1932 |
| 1,374,379 | Klein | Apr. 12, 1921 |
| 2,078,217 | Best | Apr. 27, 1937 |